(12) United States Patent
Sumner et al.

(10) Patent No.: US 11,349,988 B1
(45) Date of Patent: *May 31, 2022

(54) ESTABLISHING A VOICE AUTHENTICATION CREDENTIAL

(71) Applicant: Wells Fargo Bank, N.A., San Francisco, CA (US)

(72) Inventors: Daniel S. Sumner, Matthews, NC (US); Douglas Innocenti, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,216

(22) Filed: Aug. 31, 2020

Related U.S. Application Data

(63) Continuation of application No. 16/422,022, filed on May 24, 2019, now Pat. No. 10,764,438, which is a
(Continued)

(51) Int. Cl.
*H04M 3/51* (2006.01)
*H04M 3/493* (2006.01)

(52) U.S. Cl.
CPC ......... *H04M 3/5166* (2013.01); *H04M 3/493* (2013.01); *H04M 2203/6054* (2013.01); *H04M 2203/6063* (2013.01)

(58) Field of Classification Search
CPC ............... H04M 3/5166; H04M 3/493; H04M 2203/6063; H04M 2203/6054; H04M 2203/6027; H04M 2203/6045; H04M 3/42221; H04M 2201/41; H04M 2250/74; H04M 1/271; H04M 2201/38;
(Continued)

(56) References Cited

U.S. PATENT DOCUMENTS 8,014,496 B2 9/2011 Schultz
9,516,126 B1 12/2016 Montenegro et al.
(Continued)

OTHER PUBLICATIONS

Prosecution History from U.S. Appl. No. 15/625,766, dated Dec. 28, 2017 through Jan. 11, 2019, 71 pp.
(Continued)

*Primary Examiner* — Akelaw Teshale
(74) *Attorney, Agent, or Firm* — Shumaker & Sieffert, P.A.

(57) ABSTRACT

This disclosure describes techniques for establishing a voice authentication credential for an authenticated user of a mobile device. In one example, a system comprises an IVR system and a computing system, where the computing system comprises processing circuitry configured to: receive, over a network, authentication data from a mobile device; authenticate, based on the authentication data, a user operating the mobile device; output, over the network and to the mobile device, instructions for communicating with the IVR system; after outputting the instructions, receive, from the IVR system, information indicating that the mobile device, operated by the user, has contacted the IVR system; communicate with the IVR system to authenticate the user of the mobile device, receive, from the IVR system, a voiceprint created by the user of the mobile device; store the voiceprint as an authentication credential for the user of the mobile device.

17 Claims, 4 Drawing Sheets

Related U.S. Application Data continuation of application No. 15/625,766, filed on Jun. 16, 2017, now Pat. No. 10,306,061.

(58) Field of Classification Search
CPC ........... H04M 2201/40; H04M 3/2281; H04M 3/42059; H04M 3/5175; H04M 3/5191; H04M 2203/301; H04M 2203/558; H04M 2203/6072; H04M 3/42068; H04M 3/42391; H04M 3/4936; H04M 1/2475; H04M 1/67; H04M 1/72412; H04M 2201/18; H04M 2201/39; H04M 2203/40; H04M 2203/551; H04M 2203/552; H04M 2203/6081; H04M 2203/609; H04M 2203/651; H04M 2250/02; H04M 2250/12; H04M 3/02; H04M 3/2227; H04M 3/38; H04M 3/385; H04M 3/42025; H04M 3/42263; H04M 3/42348; H04M 3/42365; H04M 3/42382; H04M 3/436; H04M 3/4931; H04M 3/51; H04M 3/5335; H04M 3/537; H04M 3/5183; H04M 3/4938; H04M 3/533; H04M 2203/355; H04M 3/487; H04M 3/2218; H04M 2201/60; H04M 3/382; H04M 2201/42; H04M 3/5158; H04M 3/53333; H04M 2242/22; H04M 2203/254; H04M 2203/6009; H04M 3/523; H04M 3/527; H04M 3/42102; H04M 3/56; H04M 2203/401; H04M 7/006; H04M 3/42042; H04M 3/42204; H04M 3/5232; H04M 3/42153; H04M 2203/2027; H04M 3/53; H04M 2203/4536; H04M 2203/2011; H04M 2203/303; H04M 3/5235; H04M 3/5233; H04M 3/5237; H04M 1/72457; H04M 3/53366; H04M 1/72436; H04M 3/42008; H04M 7/0078; H04M 2203/2061; H04M 2203/2016; H04M 3/42; H04M 2203/253; H04M 3/4878; H04M 2207/18; H04M 3/42093; H04M 15/47; H04M 3/4211; H04M 1/656; H04M 2203/2072; H04M 1/2535; H04M 2242/14; H04M 3/4228; H04M 1/7243; H04M 1/72445; H04M 2207/12; H04M 3/4933; H04M 3/5141; H04M 15/68; H04M 2203/4509; H04M 3/36; H04M 15/41; H04M 2203/105; H04M 3/28; H04M 1/72406; H04M 3/22; H04M 3/42136; H04M 3/42161; H04M 7/12; H04M 3/42323; H04M 3/58; H04M 2203/1058; H04M 2203/252; H04M 3/4365; H04M 3/4872; H04M 3/5307; H04M 1/6041; H04M 2203/255; H04M 2203/357; H04M 3/42229; H04M 3/5231; H04M 3/53375; H04M 3/53383; H04M 1/72427; H04M 2250/56; H04M 3/53325; H04M 7/0033; H04M 15/00; H04M 15/44; H04M 2201/36; H04M 2203/407; H04M 2203/408; H04M 3/42178; H04M 3/5133; H04M 7/0054; H04M 1/57; H04M 1/72451; H04M 2203/1066; H04M 2203/306; H04M 3/46; H04M 7/0012; H04M 7/0057; H04M 1/6058; H04M 1/64; H04M 15/52; H04M 15/62; H04M 2203/258; H04M 2203/403; H04M 2203/5009; H04M 3/4234; H04M 3/5322; H04M 3/54; H04M 1/665; H04M 2203/655; H04M 2207/20; H04M 2242/30; H04M 3/387; H04M 3/465; H04M 7/0075; H04M 7/128; H04M 7/1295; H04M 11/00; H04M 11/04; H04M 15/8038; H04M 2203/2038; H04M 3/08; H04M 7/003; H04M 7/0084; H04M 1/72469; H04M 15/08; H04M 15/88; H04M 17/00; H04M 2201/405; H04M 3/42017; H04M 3/53308; H04M 7/0021; H04M 1/2473; H04M 1/725; H04M 15/58; H04M 17/02; H04M 2203/402; H04M 2203/4563; H04M 2203/555; H04M 2242/12; H04M 2250/06; H04M 3/2254; H04M 3/2272; H04M 3/367; H04M 3/42374; H04M 3/428; H04M 3/44; H04M 3/568; H04M 7/0027; H04M 7/0045; H04M 7/1235; H04M 1/652; H04M 1/72463; H04M 15/844; H04M 2201/14; H04M 2203/251; H04M 2203/556; H04M 7/00; H04M 1/2477; H04M 1/575; H04M 1/65; H04M 1/6505; H04M 1/72433; H04M 2201/12; H04M 2203/305; H04M 2203/404; H04M 2203/60; H04M 2215/0116; H04M 2215/0192; H04M 3/24; H04M 3/53358; H04M 7/0048; H04M 7/0069; H04M 7/0093; H04M 1/2478; H04M 1/663; H04M 1/72403; H04M 11/022; H04M 11/10; H04M 15/06; H04M 15/43; H04M 2203/1091; H04M 2203/2044; H04M 2203/256; H04M 2215/0164; H04M 2215/62; H04M 2250/22; H04M 3/20; H04M 3/42246; H04M 3/42314; H04M 3/4285; H04M 3/432; H04M 3/5116; H04M 3/5238; H04M 1/68; H04M 11/066; H04M 15/51; H04M 15/745; H04M 15/8221; H04M 15/8242; H04M 15/854; H04M 15/866; H04M 19/041; H04M 2203/351; H04M 2203/4554; H04M 2203/652; H04M 2215/0108; H04M 2250/60; H04M 3/323; H04M 3/42195; H04M 3/42272; H04M 3/42357; H04M 3/4288; H04M 3/48; H04M 3/4935; H04M 3/567; H04M 1/26; H04M 1/27453; H04M 1/2749; H04M 1/2757; H04M 1/576; H04M 1/645; H04M 1/72448; H04M 11/08; H04M 15/50; H04M 15/56; H04M 15/83; H04M 17/10; H04M 2203/2088; H04M 2203/5018; H04M 2215/0148; H04M 2215/0168; H04M 2215/0188; H04M 2215/68; H04M 2242/24; H04M 3/2236; H04M 3/2263; H04M 3/42238; H04M 3/4281; H04M 3/4874; H04M 3/5315; H04M 3/541; H04M 7/0024; H04M 7/0036; H04M 7/0051; H04M 7/1255; H04M 1/667; H04M 1/724; H04M 1/7385; H04M 11/06; H04M 15/10; H04M 15/881; H04M 15/882; H04M 15/888; H04M 19/02; H04M 2203/25; H04M 2203/353; H04M 2203/406; H04M 2203/554; H04M 2207/08; H04M 2207/203; H04M 2215/0196; H04M 2242/16; H04M 3/245; H04M 3/247; H04M 3/4217; H04M 3/5125; H04M 3/53316; H04M 3/53341;

H04M 3/543; H04M 3/562; H04M 7/0039; H04M 7/0066; H04M 7/1245; H04M 1/27; H04M 1/27485; H04M 1/275; H04M 1/2755; H04M 1/605; H04M 1/66; H04M 1/715; H04M 1/72454; H04M 1/72481; H04M 1/72502; H04M 15/48; H04M 15/705; H04M 15/7652; H04M 15/785; H04M 15/8033; H04M 15/8044; H04M 15/887; H04M 17/20; H04M 2201/10; H04M 2203/05; H04M 2203/154; H04M 2203/2005; H04M 2203/2083; H04M 2203/4518; H04M 2215/0104; H04M 2215/014; H04M 2215/0156; H04M 2215/2006; H04M 2215/28; H04M 2215/7009; H04M 2215/7245; H04M 2215/7295; H04M 2215/7435; H04M 2215/7806; H04M 2215/7826; H04M 2242/18; H04M 2250/52; H04M 3/241; H04M 3/42085; H04M 3/42306; H04M 3/53391; H04M 3/565; H04M 7/0042; H04M 7/126; H04M 1/247; H04M 1/27457; H04M 1/2746; H04M 1/50; H04M 1/6066; H04M 1/642; H04M 1/72466; H04M 15/8228; H04M 15/85; H04M 15/90; H04M 2201/50; H04M 2203/1033; H04M 2203/156; H04M 2203/2066; H04M 2203/308; H04M 2203/352; H04M 2203/4527; H04M 2203/4545; H04M 2203/5063; H04M 2203/5081; H04M 2207/14; H04M 2207/35; H04M 2207/40; H04M 2207/45; H04M 2215/016; H04M 2215/14; H04M 2215/143; H04M 2215/202; H04M 2215/2026; H04M 2215/32; H04M 2215/7833; H04M 2215/8166; H04M 2242/15; H04M 2250/58; H04M 2250/62; H04M 2250/68; H04M 3/00; H04M 3/007; H04M 3/2209; H04M 3/42076; H04M 3/42127; H04M 3/42144; H04M 3/42331; H04M 3/424; H04M 3/548; H04M 3/563; H04M 3/566; H04M 7/0072; H04M 7/1205; H04M 7/1215; H04M 7/123; H04M 7/127; H04M 7/129; G10L 17/00; G10L 17/04; G10L 13/00; G06F 21/32; G06F 3/167; G06F 3/16; G06F 21/31

See application file for complete search history.

(56) References Cited

U.S. PATENT DOCUMENTS

| | | | |
|---|---|---|---|
| 9,697,836 B1* | 7/2017 | Lousky | H04L 63/0861 |
| 10,306,061 B1 | 5/2019 | Sumner et al. | |
| 10,764,438 B1 | 9/2020 | Sumner et al. | |
| 2003/0229492 A1 | 12/2003 | Nolan | |
| 2006/0029190 A1* | 2/2006 | Schultz | H04M 3/385 |
| | | | 379/88.01 |
| 2006/0277043 A1* | 12/2006 | Tomes | G10L 17/04 |
| | | | 704/247 |
| 2007/0294354 A1 | 12/2007 | Sylvain | |
| 2009/0104888 A1 | 4/2009 | Cox | |
| 2012/0173348 A1 | 7/2012 | Yoo et al. | |
| 2012/0253809 A1 | 10/2012 | Thomas et al. | |
| 2014/0201536 A1 | 7/2014 | Fiske | |
| 2014/0343943 A1* | 11/2014 | Al-Telmissani | G06F 21/32 |
| | | | 704/246 |
| 2014/0376703 A1* | 12/2014 | Timem | H04M 3/42221 |
| | | | 379/88.02 |
| 2014/0379340 A1* | 12/2014 | Timem | H04L 63/102 |
| | | | 704/246 |
| 2014/0379525 A1* | 12/2014 | Timem | G06Q 20/1085 |
| | | | 705/26.41 |
| 2015/0156328 A1 | 6/2015 | Arslan et al. | |
| 2016/0105546 A1 | 4/2016 | Keys et al. | |
| 2016/0365095 A1* | 12/2016 | Lousky | G10L 17/04 |
| 2017/0194004 A1 | 7/2017 | Lousky et al. | |
| 2019/0035407 A1* | 1/2019 | Keret | G10L 17/24 |
| 2019/0050545 A1* | 2/2019 | Keret | G10L 17/24 |

OTHER PUBLICATIONS

U.S. Appl. No. 15/385,484, filed Dec. 20, 2016, by Daniel S. Summer.

U.S. Appl. No. 15/385,526, filed Dec. 20, 2016, by Daniel S. Summer.

Prosecution History from U.S. Appl. No. 16/422,022, dated Jul. 10, 2019 through Apr. 22, 2020, 66 pp.

* cited by examiner

ESTABLISHING A VOICE AUTHENTICATION CREDENTIAL

CROSS REFERENCE

This application is a continuation application of and claims priority to U.S. application Ser. No. 16/422,022, filed on May 24, 2019, which is a continuation application of and claims priority to Ser. No. 15/625,766, filed on Jun. 16, 2017, now U.S. Pat. No. 10,306,061. Each of these applications is hereby incorporated by reference herein in its entirety.

TECHNICAL FIELD

This disclosure relates to voice authentication and telephony systems.

BACKGROUND

Voice authentication systems authenticate users based on characteristics of users' voices. Voice authentication systems are designed to recognize and identify the person that is speaking, based on the acoustic features of speech that tend to differ from person to person. In most cases, voice authentication systems authenticate users by comparing a spoken passphrase with a voiceprint of a previously-recorded version of the same passphrase that was generated when voice authentication credentials were first established or later updated.

SUMMARY

This disclosure describes techniques for establishing a voice authentication credential for an authenticated user of a mobile device. Techniques in accordance with one or more aspects of the present disclosure may enable use of an interactive voice response (IVR) system for creating a voice authentication credential for a user of a computing device, such as a mobile phone. As described in one or more examples, the techniques may involve generating session data associated with a computing device operated by an authenticated user, and based on the session data, generating instructions for contacting an IVR system. The computing device may use the instructions to contact the IVR system and authenticate itself, and then interact with the IVR system to create a voice authentication credential. Thereafter, the computing device may use the voice authentication credential to access one or more services provided by a computing system. In some examples in accordance with one or more aspects of the present disclosure, an existing IVR system that is configured to provide voice biometric services for other channels, devices, and/or situations may be leveraged and/or reused to create voice authentication credentials for mobile phones.

In one example, this disclosure describes a method comprising: outputting, by a mobile device and over a network to a computing system, information that includes authentication information and a request to establish a voice authentication credential for a user operating the mobile device; enabling the computing system to determine, based on the authentication information, that the mobile device is operated by an authorized user; receiving, by the mobile device over the network, instructions for communicating with an interactive voice response (IVR) system; establishing, by the mobile device and based on the instructions, communications with the IVR system over the network; enabling the IVR system to verify, based on the communications, that the mobile device that established communications with the IVR system previously output the request to establish a voice authentication credential; detecting, by the mobile device, audio data; outputting, by the mobile device and over the network to the IVR system, information about the audio data; and enabling the IVR system to create a voiceprint based on the audio data and communicate the voiceprint to the computing system for use as an authentication credential.

In another example, this disclosure describes a computing device comprising a storage system and processing circuitry, wherein the processing circuitry has access to the storage system and is configured to: output, over a network to a computing system, information that includes authentication information and a request to establish a voice authentication credential for a user operating the mobile device; enable the computing system to determine, based on the authentication information, that the mobile device is operated by an authorized user; receive, over the network, instructions for communicating with an interactive voice response (IVR) system; establish, based on the instructions, communications with the IVR system over the network; enable the IVR system to verify, based on the communications, that the mobile device that established communications with the IVR system previously output the request to establish a voice authentication credential; detect audio data; output, over the network to the IVR system, information about the audio data; and enable the IVR system to create a voiceprint based on the audio data and communicate the voiceprint to the computing system for use as an authentication credential.

In another example, this disclosure describes a computer-readable storage medium comprising instructions that, when executed, configure processing circuitry of a computing system to: output, over a network to a computing system, information that includes authentication information and a request to establish a voice authentication credential for a user operating the mobile device; enable the computing system to determine, based on the authentication information, that the mobile device is operated by an authorized user; receive, over the network, instructions for communicating with an interactive voice response (IVR) system; establish, based on the instructions, communications with the IVR system over the network; enable the IVR system to verify, based on the communications, that the mobile device that established communications with the IVR system previously output the request to establish a voice authentication credential; detect audio data; output, over the network to the IVR system, information about the audio data; and enable the IVR system to create a voiceprint based on the audio data and communicate the voiceprint to the computing system for use as an authentication credential.

DETAILED DESCRIPTION

Figure 1A:
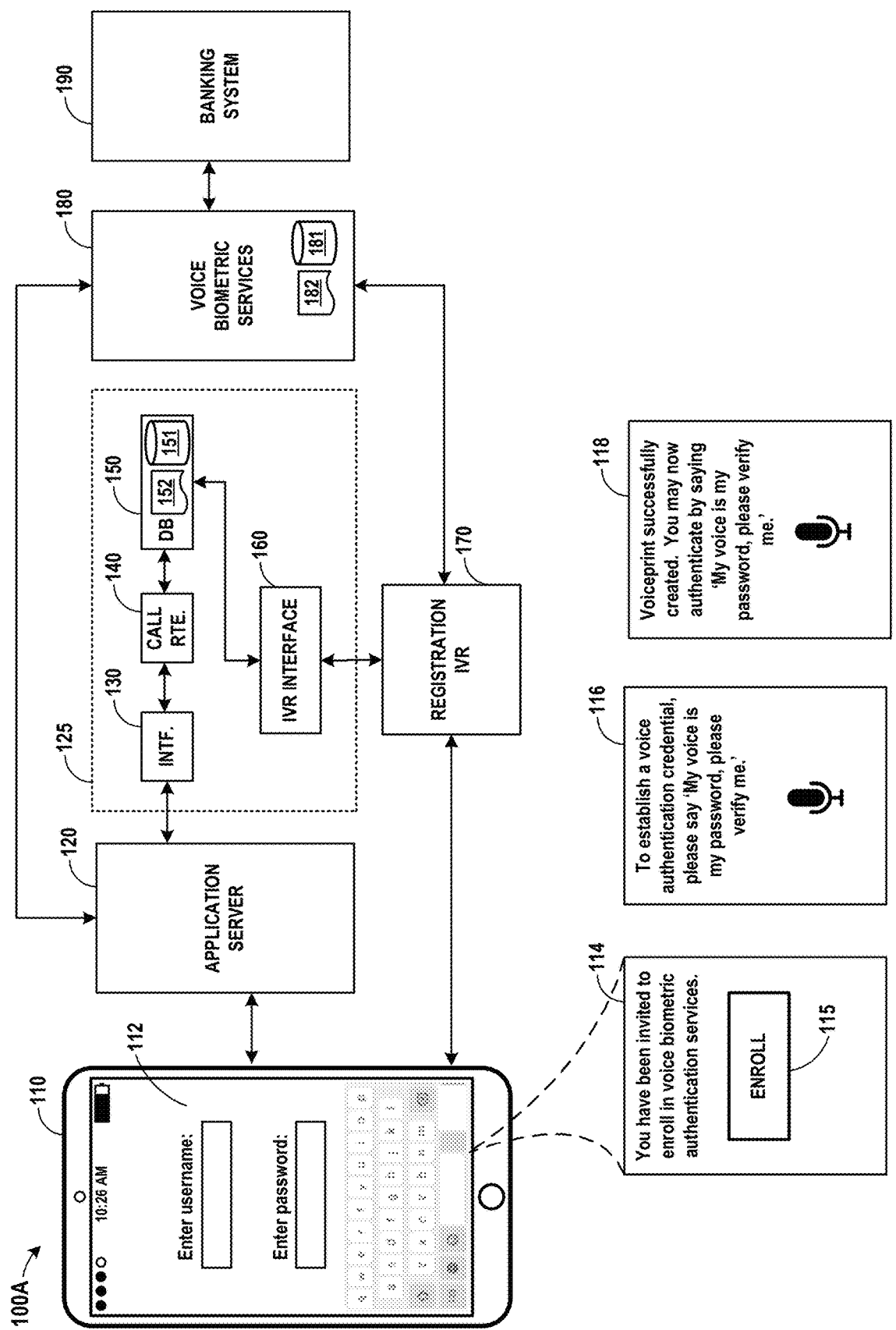
FIG. 1A and FIG. 1B are conceptual diagrams illustrating example systems for creating and using a voice authentication credential, in accordance with one or more aspects of the present disclosure.
Figure 1B:
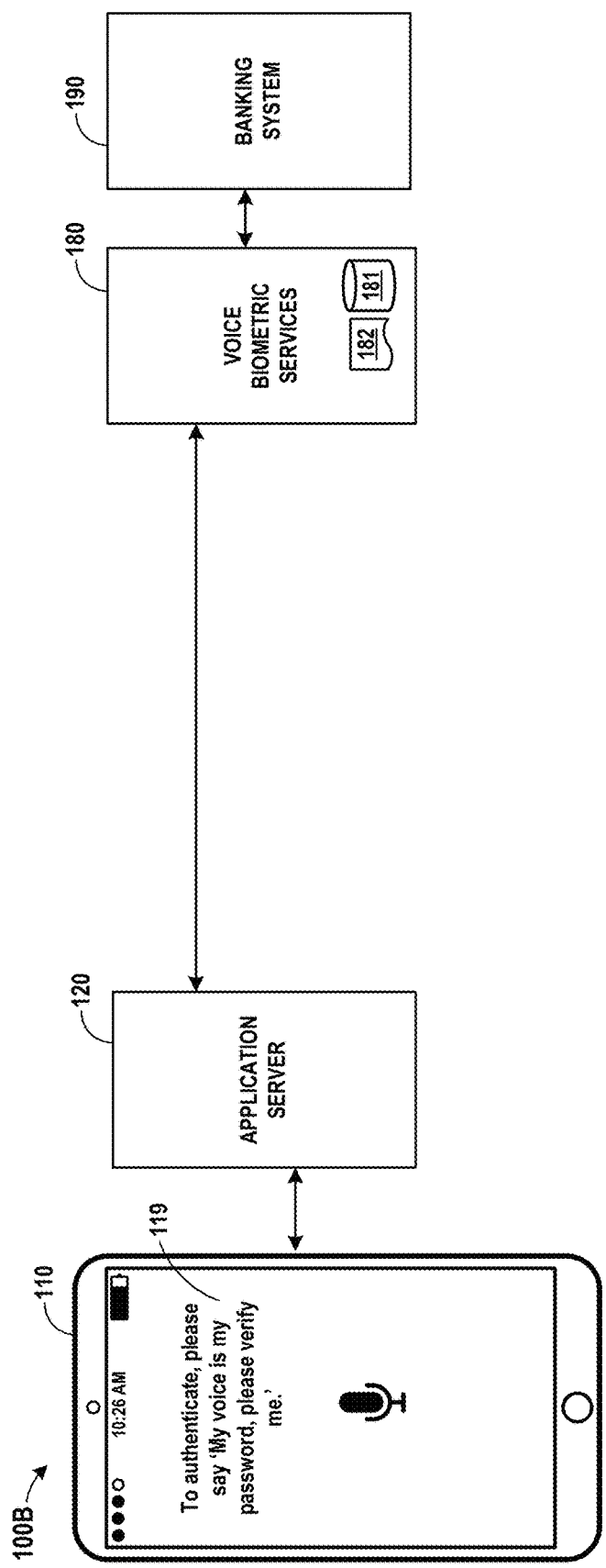

FIG. 1A and FIG. 1B are conceptual diagrams illustrating example systems for creating and using a voice authentication credential, in accordance with one or more aspects of the present disclosure. FIG. 1A illustrates one example implementation of system 100A for creating a voice authentication credential. FIG. 1B illustrates one example implementation of system 100B for using a voice authentication credential. In the example of FIG. 1A, system 100A includes computing device 110 (e.g., a mobile phone) in communication with application server 120 and a registration interactive voice response (IVR) system 170. FIG. 1A further includes enrollment system 125, voice biometric services system 180, and banking system 190. In FIG. 1A, enrollment system 125 includes call routing interface ("INTF.") 130, call routing system ("CALL RTE.") 140, database services system ("DB") 150, and IVR interface 160. Database services system 150 includes database 151 and one or more instances of session data 152. Voice biometric services system 180 includes voiceprint data store 181 and one or more voiceprints 182. In the example of FIG. 1B, system 100B includes computing device 110 in communication with application server 120, and application server 120 in communication with voice biometric services system 180. In accordance with one or more aspects of the present disclosure, other implementations of system 100A and/or system 100B may be appropriate in other instances. Such implementations may include a subset of the components included in the examples of FIG. 1A and FIG. 1B and/or may include additional components not shown in FIG. 1A or FIG. 1B.

Although functions and operations described in connection with FIG. 1A and FIG. 1B may be illustrated as being distributed across multiple devices, in other examples, the features and techniques attributed to one or more devices in FIG. 1A and/or FIG. 1B may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1A and/or FIG. 1B or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be alternatively attributed to other components, devices, and/or modules, even if not specifically described herein in such a manner.

In some examples, computing device 110 interacts with database services system 150 to enable computing device 110 to establish communications with IVR system 170 as an authorized user, thereby enabling computing device 110 to establish a voice authentication credential using IVR system 170. For instance, in the example of FIG. 1A, computing device 110 communicates with database services system 150 through application server 120, call routing interface 130, call routing system 140, and then to database services system 150 to store session data 152. Database services system 150 then issues instructions to computing device 110 that enable computing device 110 to contact IVR system 170. Computing device 110 contacts IVR system 170 and identifies itself to IVR system 170. IVR system 170 interacts with database services system 150, through IVR interface 160, to verify that computing device 110 is the same device that interacted with database services system when session data 152 was previously stored. Once verified, computing device 110 may interact with IVR system 170 to establish a voice authentication credential. Once the credential is established, computing device 110 may thereafter authenticate with application server 120 using the voice authentication credential.

In FIG. 1A, computing device 110 is a mobile phone, but computing device 110 may be implemented as any suitable computing system, such as a mobile, non-mobile, wearable, and/or non-wearable computing device. Computing device 110 may therefore represent any computing device that performs operations described herein as the result of instructions, stored on a computer-readable storage medium, executing on one or more processors. The instructions may be in the form of software stored on one or more local or remote computer readable storage devices. In other examples, computing device 110 may perform operations using hardware, firmware, or a mixture of hardware, software, and firmware residing in and/or executing at computing device 110. If not implemented as a mobile phone, computing device 110 may represent a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, an Internet of Things (IOT) device, a laptop or notebook computer, a desktop computer, or any other type of wearable, non-wearable, mobile, or non-mobile computing device that may perform operations in accordance with one or more aspects of the present disclosure. Further, although computing device 110 may be a stand-alone device, computing device 110 may be implemented in any of a wide variety of ways. For example, computing device 110 may be implemented through multiple devices and/or systems. In another example, computing device 110 may be, or may be part of, any component, device, or system that includes a processor or other suitable computing environment for processing information or executing software instructions.

Computing device 110 may serve as a computing device that enables a user to interact with, browse, and/or use information or resources available over a network. For instance, computing device 110 may, at the direction of a user, browse for information, communicate with others, engage in mobile banking operations, perform calculations, analyze data, monitor or check or process a user's personal communications, control other devices, perform a physical task or cause one to be performed, access other information or resources, and/or perform financial related operations and/or tasks. Computing device 110 may pair with and/or communicate with other devices, and may send control signals to other devices or systems.

One or more application servers 120 may represent a system that operates to perform functions on behalf of one or more computing devices 110, such as mobile phones. Application server 120 may be implemented through any suitable computing system, such as one or more server computers, mainframes, workstations, cloud computing systems, server farms, or server clusters. In the example of FIG. 1A, application server 120 is a mobile application server device capable of performing functions on behalf of one or more mobile phones, smartphones, or other mobile computing devices. Application server 120 may be operated or controlled by a service provider, a financial institution, and/or other entity, and may, for example, provide mobile banking or financial services.

Call routing interface 130 may represent an interface to call routing system 140, and may interact with call routing system 140 and cause call routing system 140 to perform functions on behalf of call routing interface 130 and/or application server 120. In some examples, call routing interface 130 may be implemented using, for example, a CafeX Mobile Advisor solution from CafeX Communications, Inc. Also, in some examples, application server 120 may communicate with call routing interface 130 through Java application programming interface (API) calls or through another interface or API. Other possible implementations for call routing interface 130 are contemplated, and may be suitable for performing functions, tasks, or operations pertaining to one or more aspects of the present disclosure. In some examples, call routing interface 130 may receive a signal from application server 120 initiating a process to establish a voice authentication credential for an authenticated user (e.g., a user of computing device 110). Call routing interface 130 may send information to call routing system 140 including information about computing device 110 and/or a user of computing device 110.

Call routing system 140 may represent a call routing system or call center system that may operate and/or perform functions in response to interactions with call routing interface 130 or other devices or systems of system 100A. In some examples, call routing system 140 may be implemented using call routing solutions available through Genesys Telecommunications Laboratories. In some examples, call routing system 140 may receive, from call routing interface 130, information about computing device 110 and/or a user of computing device 110. Call routing system 140 may generate a phone number that computing device 110 may use to contact IVR system 170, and may associate with the phone number an expiration time. Call routing system 140 may communicate information to database services system 150 that database services system 150 may store as session data 152.

Database services system 150 may perform data storage related functions, including storing session data 152 within database 151. Database services system 150 may generate a one-time passcode for use by computing device 110. Database services system 150 may also extract from information received from call routing system 140 a device identifier associated with computing device 110. Database services system 150 may, generally, collect and aggregate session data 152 for computing device 110, and similar session data for one or more additional computing devices 110 operated by other users. Database services system 150 may issue instructions to computing device 110 for interacting with IVR system 170. Database services system 150 may authorize requests by IVR system 170, received through IVR interface 160, to authenticate and/or approve of interactions with IVR system 170 by one or more computing devices 110. Alternatively, database services system 150 may send information to IVR system 170 through IVR interface 160 (or provide access to such information), and thereby enable IVR system 170 to verify the identity and/or authenticity of one or more computing devices 110.

IVR interface 160 may provide an interface between database services system 150 and IVR system 170. In some examples, IVR interface 160 is implemented as a routing web services platform that communicates requests, by IVR system 170, to authenticate or verify information received from computing device 110 by IVR system 170. IVR interface 160 may receive from database services system 150 a signal that IVR interface 160 routes to IVR system 170 indicating whether information received from computing device 110 by IVR system 170 matches session data 152 established for computing device 110.

IVR system 170 may represent an interactive voice response (IVR) system that performs voice authentication enrollments and/or registers users of computing devices 110 to use voice biometric authentication credentials. In that sense, IVR system 170 may be considered a registration IVR. In some examples, IVR system 170 may be configured to interact with humans through the use of voice and dual tone multi frequency (DTMF) tones, often generated as a result of keypad input. IVR system 170 enables a human to interact with voice biometric services system 180 through keypad input or by speech recognition or through other means. IVR system 170 may, for example, enable a user of computing device 110 to establish a voice authentication credential. IVR system 170 may also be capable of performing call routing services. For instance, in some examples, IVR system 170 may route a call to a live person when requested by a user or when user actions suggest that interactions with a live person are appropriate (e.g., a user having difficulty establishing a voice authentication credential).

Voice biometric services system 180 may perform functions relating to establishing a voiceprint for use with a voice authentication services. Voice biometric services system 180 may receive information about audio detected by a computing device or mobile phone, and may analyze the audio to determine whether the audio is appropriate for use as a voiceprint. Voice biometric services system 180 may use audio information to create voiceprints and may store such voiceprints within voiceprint data store 181 as one or more voiceprints 182. Voice biometric services system 180 may determine whether audio data corresponds and/or matches one or more voiceprints stored within voiceprint data store 181. Voice biometric services system 180 may output signals (e.g., to application server 120 and/or to IVR system 170) that indicate whether audio input corresponds to one or more voiceprints stored within voiceprint data store 181. In some examples, voice biometric services system 180 may, over time, update any stored voiceprints 182 to take into account changes in a user's voice or changes in equipment (e.g., improved audio input capability) that a user may use to capture audio data corresponding to an uttered passphrase. Voiceprint data store 181 may be searchable and/or categorized such that a device, module, or system may provide input requesting information from voiceprint data store 181, and in response to the input, receive information stored within voiceprint data store 181.

In some examples, IVR system 170 in combination with voice biometric services system 180 may serve as a single and/or central point of voice biometric authentication enrollment for multiple channels. For instance, IVR system 170 and voice biometric services system 180 may provide voice biometric enrollment services for other systems or interactive voice response systems, such as those used by a bank to enable customers to access financial and/or banking records. Aspects of IVR system 170 and voice biometric services system 180 may also be used to provide enrollment services for a voice authentication credential that is used by computing devices 110 that access authenticated services through application server 120. In this way, an existing voice biometric enrollment system, which may be represented by IVR system 170 and voice biometric services system 180, can be used for voice biometric authentication enrollment for users of computing device 110.

Banking system 190 may represent one or more systems providing services to one or more computing devices 110. In some examples, banking system 190 may represent a system that provides access to financial information to authenticated users of computing devices 110. For instance, a user of computing device 110 may, upon establishing a voice authentication credential and authenticating with the credential, access banking records and/or perform online banking tasks by providing input to computing device 110. Although aspects of this disclosure are described in terms of a banking context, it should be understood that many aspects of the present disclosure are also applicable to other contexts outside of banking and financial services.

In the example of FIG. 1A, and in accordance with one or more aspects of the present disclosure, application server 120 may authenticate a user of computing device 110. For instance, in the example of FIG. 1A, computing device 110 detects input that it determines corresponds to a request to interact with application server 120. Computing device 110 presents user interface 112, and in response, detects input. In some examples, the input detected corresponds to a username and password associated with computing device 110 generally or, alternatively, with a specific application executing on computing device 110. Computing device 110 sends a signal to application server 120. Application server 120 receives the signal and determines that the signal corresponds to a request to authenticate a user. Application server 120 may further determine that the signal includes authentication credentials (e.g., the username and password) for a user of computing device 110. Application server 120 determines that the authentication request and authentication credentials correspond to a valid user of computing device 110. Application server 120 may further communicate with computing device 110 and establish a session for the authenticated user at computing device 110.

Computing device 110 may cause database services system 150 to generate and/or store session data 152. For instance, in the example of FIG. 1A, computing device 110 presents user interface 114, prompting a user to enroll in voice biometric authentication services. After presenting user interface 114, computing device 110 detects input that it determines corresponds to interaction with button 115 within user interface 114. Computing device 110 sends a signal to application server 120. Application server 120 receives the signal and determines that the signal corresponds to a request to establish a voice authentication credential. Application server 120 outputs a signal to call routing interface 130, including information about computing device 110 and/or a user of computing device 110, and initiating a process to establish a voice authentication credential for the authenticated user of computing device 110. In some examples, the signal sent by application server 120 to call routing interface 130 may be in the form of a Cisco Java API call to call routing interface 130.

Call routing interface 130 receives the signal, and determines that the signal corresponds to a request, by application server 120, to generate call routing instructions to enable an authenticated user of computing device 110 to interact with IVR system 170 and thereby set up a voice authentication credential. Call routing interface 130 sends a signal to call routing system 140, including information about computing device 110 and/or a user of computing device 110, and requesting that call routing system 140 generate call routing instructions. Call routing system 140 outputs to database services system 150 a signal to initiate generation and/or extraction of session data for use in later verification of computing device 110 for IVR system 170. Database services system 150 generates a one-time passcode for use by a user of computing device 110, and extracts from information received from call routing system 140 a mobile device identifier associated with computing device 110. Database services system 150 stores session data 152 associated with computing device 110 in database 151. In some examples, the one-time passcode may act as the primary key for storage of mobile session data within a relational database represented by database 151. Session data 152 may include the one-time passcode generated by database services system 150, the device identifier associated with computing device 110, and/or other information associated with the authenticated mobile session established between computing device 110 and application server 120.

Database services system 150 may issue instructions to computing device 110 that enable computing device 110 to interact with IVR system 170 as an authenticated device. For instance, in the example of FIG. 1A, database services system 150 sends a signal to call routing system 140 including at least some of session data 152 stored by database services system 150. Call routing system 140 receives the signal from database services system 150, and in response, generates a phone number (e.g., a 1-800 phone number) that computing device 110 may use to contact IVR system 170. Call routing system 140 may also associate, store, and/or include an expiration time with the phone number and/or session data 152 received from database services system 150. In some examples, session data 152 stored by database services system 150 may be time-limited, so that if computing device 110 does not establish a voice authentication credential within a certain time period, some or all of session data 152 expires, and can no longer be used to establish a voice authentication credential. Call routing system 140 may send, to call routing interface 130, the phone number generated by call routing system 140 along with at least some of session data 152. Call routing interface 130 receives the information from call routing system 140, and outputs to application server 120 information derived from the information received from call routing system 140. Application server 120 receives information from call routing interface 130 and generates instructions based on the information received from call routing interface 130. Application server 120 outputs the instructions to computing device 110.

Computing device 110 may use the instructions to establish communications with IVR system 170 as an authenticated device. For instance, in the example of FIG. 1A, computing device 110 receives the instructions from application server 120 and determines that the instructions include information for contacting IVR system 170. In some examples, the instructions include a phone number for contacting IVR system 170 and a one-time passcode included within session data 152. Computing device 110 initiates a phone call to IVR system 170 using the phone number received from application server 120. In some examples, computing device 110 initiates the phone call over a public switched telephone network, a cellular phone network, or other voice-oriented network to IVR system 170.

IVR system 170 receives the phone call, and establishes communication with computing device 110. Computing device 110 communicates to IVR system 170 the device identifier associated with computing device 110 and also the one-time passcode included in session data 152. In some examples, the device identifier and/or the one-time passcode are automatically communicated to IVR system 170 by computing device 110 using DTMF tones during the call session between computing device 110 and IVR system 170. IVR system 170 receives the device identifier and the one-time passcode from computing device 110. In response, IVR system 170 sends a signal to database services system 150 through IVR interface 160. Database services system 150 receives the signal, and determines that the signal corresponds to a request to verify that a user of computing device 110 is authorized to create a voice-based authentication credential. Database services system 150 may further determine that the signal includes a device identifier and a passcode. Database services system 150 authorizes the request by comparing the device identifier and the passcode received from IVR system 170 with the information in session data 152. If database services system 150 determines that the information matches, database services system 150 outputs a signal to IVR system 170 through IVR interface 160. IVR system 170 receives the signal and determines that the signal corresponds to an indication that computing device 110 is the same device that initiated a request to establish a voice authentication credential. In some examples, database services system 150 sends such a signal to enable IVR system 170 to establish a voice authentication credential for the user of computing device 110; in at least some cases, IVR system 170 might not establish a voice authentication credential without receipt of such a signal. Alternatively, in some examples, database services system 150 may enable IVR system 170 to establish a voice authentication credential by providing, to IVR system 170, access to database 151 through IVR interface 160, so that IVR system 170 may perform any comparison and/or verification operations itself.

After establishing that computing device 110 is the same device that initiated the request to establish a voice authentication credential, and during the call session between computing device 110 and IVR system 170, IVR system 170 may establish a voice authentication credential for a user of computing device 110. For instance, in the example of FIG. 1A, IVR system 170 outputs a signal to computing device 110. Computing device 110 receives the signal and determines that the signal corresponds to information sufficient to generate a user interface. Computing device 110 generates a user interface and presents it to a user of computing device 110. In some examples, the user interface is simply an audio prompt, and may, for example, prompt a user of computing device 110 to say a passphrase that can be used to generate voice biometric print. In other examples, the user interface may alternatively, or in addition, include a visual prompt presented at a display screen associated with computing device 110 (e.g., user interface 116). In the example of FIG. 1A, a user of computing device 110 is prompted to say a passphrase. Computing device 110 receives input that it determines corresponds to an audio response to the prompt. Computing device 110 outputs to IVR system 170 an indication of the audio response. IVR system 170 receives the indication of the audio response, and outputs to voice biometric services system 180 information about the audio response. Voice biometric services system 180 receives the information about the audio response, and determines whether the audio response is sufficient to create a voiceprint. In the example illustrated in FIG. 1A, voice biometric services system 180 determines that the audio response is sufficient to create a voiceprint, so voice biometric services system 180 creates voiceprint 182 for the user of computing device 110, and stores it within voiceprint data store 181 of voice biometric services system 180. Computing device 110 may present user interface 118.

In some examples, IVR system 170 may cause computing device 110 to prompt a user of computing device 110 to repeat a passphrase more than one time (e.g., three times) to ensure that aspects of the voiceprint are analyzed and/or recorded properly. Further, IVR system 170 may cause computing device 110 to prompt a user of computing device 110 to say a standard passphrase that may be the same passphrase used by others when generating a voiceprint. For instance, one common passphrase is "my voice is my password, please verify me." In some systems, most or all users perform voice authentication by uttering this same phrase.

Once voiceprint 182 has been established as described above, later authentication of the user operating computing device 110 may be performed by application server 120 interacting directly with voice biometric services system 180. In some examples, as shown in FIG. 1B, enrollment system 125 and IVR system 170 might not be needed to authenticate a user of computing device 110.

Accordingly, a user of computing device 110 may authenticate with application server 120 using the voice authentication credential established at voice biometric services system 180. For instance, in the example of FIG. 1B, computing device 110 detects input that it determines corresponds to a request to interact with application server 120. Computing device 110 presents a user interface prompting a user to say a passphrase, and in response, detects audio input. In some examples, such a user interface is a visual prompt (e.g., user interface 119), and in other examples, such a user interface is alternatively, or in addition, an audio prompt. Computing device 110 outputs to application server 120 an indication of audio input. Application server 120 receives the indication of audio input, and determines that the audio input corresponds to a request to authenticate using voice biometrics. Application server 120 outputs information about the audio input to voice biometric services system 180. Voice biometric services system 180 evaluates the audio input and determines that the audio input corresponds to the passphrase uttered by the user of computing device 110 when establishing voiceprint 182. Voice biometric services system 180 sends a signal to application server 120. Application server 120 receives the signal and determines that the signal indicates that the user of computing device 110 has been authenticated. Application server 120 may further determine that the signal includes information identifying the authenticated user. Application server 120 and computing device 110 further communicate and establish a session for the authenticated user at computing device 110. Computing device 110 may thereafter send signals to application server 120 in response to input detected by computing device 110, and application server 120 may, in response to such signals, perform services (e.g., banking or other services) on behalf of the authenticated user of computing device 110. For instance, application server 120 and/or voice biometric services system 180 may communicate with banking system 190 to provide financial services to a user of computing device 110.

By enabling an IVR environment to be used to establish a voice authentication credential for a user that is authenticated through a mobile computing device, system 100A may take advantage of existing voice authentication registration IVR systems that are reliably used for creating voice authentication credentials for other channels and applications. By using existing voice authentication registration IVR systems, system 100A may gain benefits of using a single and/or centralized voice biometrics enrollment environment for multiple channels, devices, applications, and environments. For instance, a single and/or centralized enrollment environment may be easier to maintain than multiple enrollment environments. Further, with only one enrollment environment, more resources can be devoted to improving the operation and ensuring the security of the enrollment environment than if there were multiple enrollment environments needed to be developed and maintained. Accordingly, as a result of enabling a user authenticated through a mobile device to create an authentication credential using an existing IVR environment, system 100A and/or system 100B may be more reliable and more secure. Therefore, aspects of this disclosure may improve the function of system 100A and system 100B (or aspects of or systems within such systems) because using a centralized or single enrollment environment may have the effect of improving the security and/or operation of system 100A and system 100B.

Figure 2:
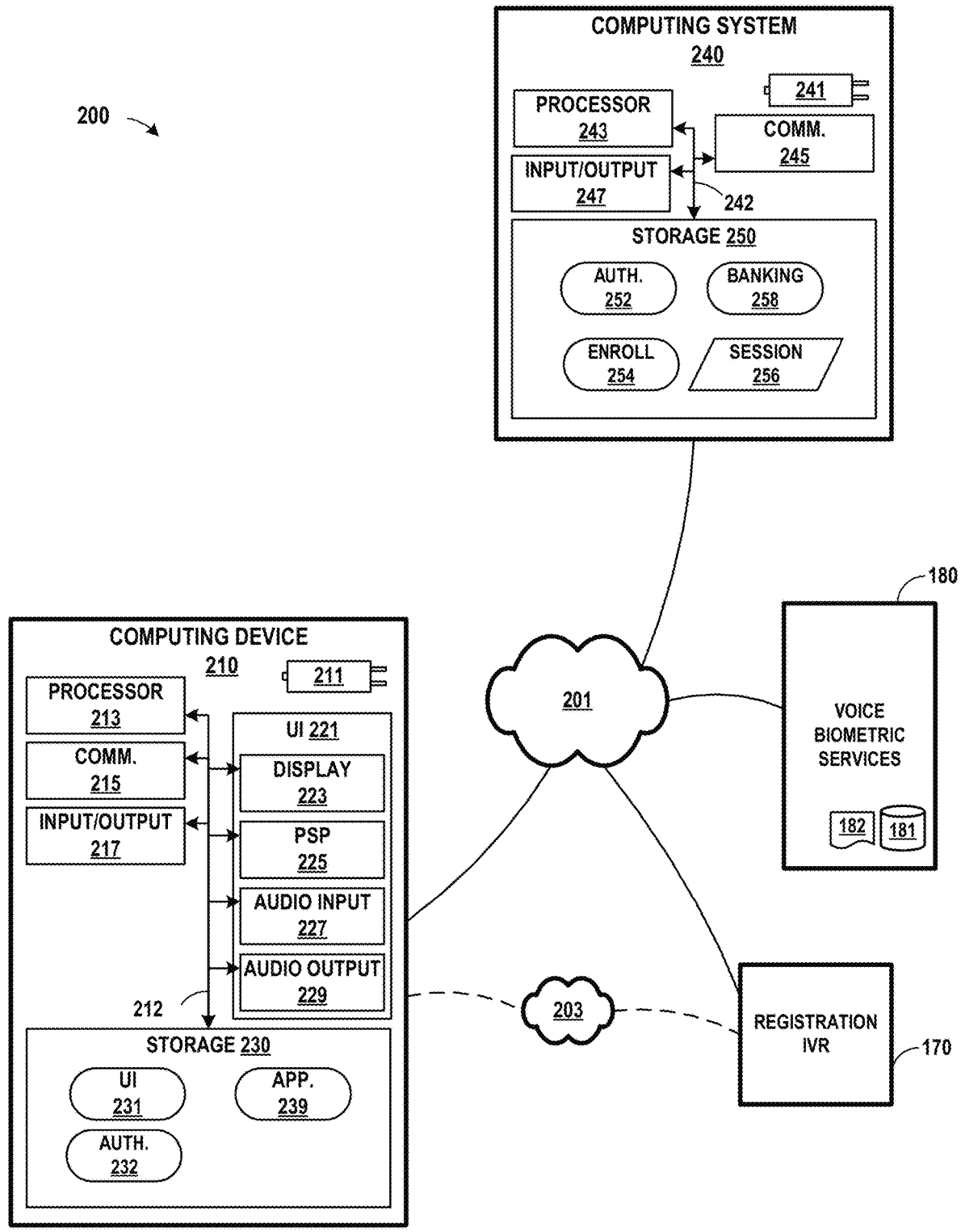
FIG. 2 is a block diagram illustrating an example system for creating and using a voice authentication credential, in accordance with one or more aspects of the present disclosure.

FIG. 2 is a block diagram illustrating an example system for creating and using a voice authentication credential, in accordance with one or more aspects of the present disclosure. System 200 of FIG. 2 may be described as an example or alternate implementation of system 100A of FIG. 1A and/or system 100B of FIG. 1B. One or more aspects of FIG. 2 may be described herein within the context of system 100A of FIG. 1A and/or system 100B of FIG. 1B. FIG. 2 illustrates one example implementation of system 200. Other example implementations of system 200 may be appropriate in other instances. Such implementations may include a subset of the devices and/or components included in the example of FIG. 2 and/or may include additional devices and/or components not shown in FIG. 2.

System 200 and devices illustrated as part of system 200 in FIG. 2 may be implemented in a number of different ways. In some examples, one or more devices of system 200 that are illustrated as separate devices may be implemented as a single device; one or more components of system 200 that are illustrated as separate components may be implemented as a single component. Also, in some examples, one or more devices of system 200 that are illustrated as a single device may be implemented as multiple devices; one or more components of system 200 that are illustrated as a single component may be implemented as multiple components. Further, one or more devices or components of system 200 that are illustrated in FIG. 2 may be implemented as part of another device or component not shown in FIG. 2. Some of the functions described herein may be performed via distributed processing by two or more devices.

In the example of FIG. 2, system 200 includes one or more computing devices 210 in communication, via network 201, with computing system 240, voice biometric services system 180, and IVR system 170. As shown in FIG. 2, computing device 210 may alternatively, or in addition, communicate with IVR system 170 over voice-oriented network 203.

In FIG. 2, IVR system 170 and voice biometric services system 180 may correspond to IVR system 170 and voice biometric services system 180 of FIG. 1A. Computing device 210 of FIG. 2 may correspond to computing device 110 of FIG. 1A and FIG. 1B, and may be implemented in a manner consistent with the description of computing device 110 provided in connection with FIG. 1A and FIG. 1B. For ease of illustration, only one computing device 210 is illustrated in FIG. 2, although techniques in accordance with one or more aspects of this disclosure may be performed with many computing devices 210.

Also, in FIG. 2, computing system 240 may generally correspond to a combined application server 120 and enrollment system 125, and may perform some of the same functions described in connection with FIG. 1A as having been performed by application server 120 and/or enrollment system 125. Although illustrated as a single device in FIG. 2, computing system 240 may be implemented as a number of separate devices or systems (e.g., as in FIG. 1A), or as part of another system. In some examples, some or all of the functionality provided by computing system 240 may be provided by a public or private cloud system, server farm, or server cluster (or portion thereof).

Network 201 may be the internet, or may include or represent any public or private communications network or other network. For instance, network 201 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 201 using any suitable communication techniques. Network 201 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 201 using one or more network links. The links coupling such devices or systems to network 201 may be Ethernet, Asynchronous Transfer Mode (ATM) or other types of network connections, and such connections may be wireless and/or wired connections. One or more of the devices or systems illustrated in FIG. 2 or otherwise on network 201 may be in a remote location relative to one or more other illustrated devices or systems.

Voice-oriented network 203 may represent a collection of interconnected networks that primarily carry voice traffic. In some examples, voice-oriented network 203 may represent a public switched telephone network (PSTN) that is used by one or more computing devices 110 to connect to, communicate with, and interact with IVR system 170. Voice-oriented network 203 may represent a collection of networks that may be public, private, commercial, and/or government-owned. Although illustrated in FIG. 2 as being separate from network 201, in other examples, voice-oriented network 203 may be part of network 201, or may be considered to be part of network 201.

Computing system 240 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 240 represents a cloud computing system, server farm, and/or server cluster (or portion thereof) that provides services to client devices and other devices or systems. For example, computing system 240 may host or provide access to services provided by one or more modules (e.g., authentication module 252, enrollment module 254, and banking module 258) of computing system 240. Client devices (e.g., one or more computing devices 110) may communicate with computing system 240 over network 201 to access services provided by one or more modules of computing system 240. Computing system 240 may provide, for instance, authentication, banking, financial, and/or other services in response to input received from one or more client devices.

Although computing system 240 of FIG. 2 may be a stand-alone device, one or more computing systems 240 may be implemented in any of a wide variety of ways, and may be implemented using multiple devices and/or systems. In some examples, one or more computing systems 240 may be, or may be part of, any component, device, or system that includes a processor or other suitable computing environment for processing information or executing software instructions and that operates in accordance with one or more aspects of the present disclosure. In some examples, computing system 240 may be fully implemented as hardware in one or more devices or logic elements.

In the example of FIG. 2, computing system 240 may include power source 241, one or more processors 243, one or more communication units 245, one or more input/output devices 247, and one or more storage devices 250. Storage device 250 may include authentication module 252, enrollment module 254, session data 256, and banking module 258. One or more of the devices, modules, storage areas, or other components of computing system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Power source 241 may provide power to one or more components of computing system 240. In some examples, power source 241 may receive power from the primary alternative current (AC) power supply in a building, home, or other location. In other examples, power source 241 may be or may include a battery.

One or more processors 243 of computing system 240 may implement functionality and/or execute instructions associated with computing system 240 or associated with one or more modules illustrated herein and/or described below. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Computing system 240 may use one or more processors 243 to perform operations in accordance with one or more aspects of the present disclosure using software, hardware, firmware, or a mixture of hardware, software, and firmware residing in and/or executing at computing system 240.

One or more communication units 245 of computing system 240 may communicate with devices external to computing system 240 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. In other examples, communication units 245 of computing system 240 may transmit and/or receive satellite signals on a satellite network such as a Global Positioning System (GPS) network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input/output devices 247 may represent any input or output devices of computing system 240 not otherwise separately described herein. One or more input/output devices 247 may generate, receive, and/or process input from any type of device capable of detecting input from a human or machine. One or more input/output devices 247 may generate, present, and/or process output through any type of device capable of producing output.

One or more storage devices 250 within computing system 240 may store information for processing during operation of computing system 240. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of computing system 240 and/or one or more devices or systems illustrated as being connected to computing system 240.

In some examples, one or more storage devices 250 are temporary memories, meaning that a primary purpose of the one or more storage devices is not long-term storage. Storage devices 250 of computing system 240 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

Authentication module 252 may perform functions relating to authenticating a user of computing device 210. Authentication module 252 may receive authentication credentials from one or more users of computing devices 210.

In some examples, the authentication credentials may be a username and password combination, and in other examples, the authentication credentials may include a voiceprint or audio data generated as a result of a user of computing device 210 uttering a passphrase. Authentication module 252 may evaluate the authentication credentials, identify the user, and establish a session with one or more computing devices 110. Although authentication module 252 may be described in connection with FIG. 2 as primarily performing authentication operations, authentication module 252 may also perform operations relating to voice biometric services enrollment of one or more users of computing devices 210.

Enrollment module 254 may perform functions relating to establishing an authentication credential for one or more users of computing device 210. In some examples, enrollment module 254 generates session data 256 for a user of computing device 210. Enrollment module 254 may use session data 256 to generate instructions that enable computing device 210 to contact and interact with IVR system 170. IVR system 170 may, in response to such interaction, communicate with enrollment module 254 to verify that communications received by IVR system 170 are from computing device 210, thereby authenticating a user of computing device 210 for IVR system 170.

Session data 256 may include information derived from or generated based on information received in communications with one or more computing devices 210. For instance, in some examples, session data 256 may include a device identifier associated with computing device 210, a passcode associated with the session with computing device 210, and a phone number that computing device 210 may use to contact IVR system 170. Session data 256 may be created and updated by enrollment module 254, and may be time-limited and/or subject to an expiration time. Enrollment module 254 may access session data 256 and compare information received from IVR system 170 to session data 256 to identify and/or verify one or more computing devices 210 that have communicated with IVR system 170 seeking to establish a voice authentication credential.

Banking module 258 may perform functions and/or services relating to banking and/or providing banking information. For example, banking module 258 may access financial information for an authenticated user of computing device 210 (or other client device) in response to a request received from computing device 210. Banking module 258 may access such information within computing system 240, or may access such information through another system over a network. Banking module 258 may cause communication unit 245 to send information to computing device 210 that computing device 210 uses to generate a user interface for presentation at computing device 210. Such a user interface may include banking information relating to the authenticated user of computing device 210. Banking module 258 may receive, from computing device 210 an indication of input that banking module 258 determines corresponds to a request to perform a banking function and/or banking service. Banking module 258 may, in response to such a request, interact with one or more other modules or computing devices to perform the requested function.

In the example of FIG. 2, computing device 210 may represent an example of one of a number of computing devices 210 that may interact with computing system 240 and/or other systems illustrated in FIG. 2 in accordance with one or more aspects of the present disclosure. Computing device 210 of FIG. 2 may include power source 211, one or more processors 213, one or more communication units 215, one or more input/output devices 217, one or more user interface devices 221, and one or more storage devices 230. User interface device 221 may include one or more displays 223, one or more presence-sensitive panels 225, one or more audio input devices 227, and one or more audio output devices 229. Storage 230 may include user interface module 231, authentication module 232, and application modules 239. One or more of the devices, modules, storage areas, or other components of computing device 210 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of computing device 210. Power source 211 may be a battery. Power source 211 may have intelligent power management or consumption capabilities, and may such features may be controlled, accessed, or adjusted by one or more modules of computing device 210 and/or by one or more processors 213 to intelligently consume, allocate, supply, or otherwise manage power.

One or more processors 213 of computing device 210 may implement functionality and/or execute instructions associated with computing device 210 or associated with one or more modules illustrated herein and/or described below. One or more processors 213 may be, may be part of, and/or may include processing circuitry that performs operations in accordance with one or more aspects of the present disclosure.

One or more communication units 215 of computing device 210 may communicate with devices external to computing device 210 by transmitting and/or receiving data, and may operate, in some respects, as both an input device and an output device. In some examples, communication unit 215 may communicate with other devices over a network (e.g., network 201). In other examples, communication units 215 may send and/or receive radio signals on a radio network such as a cellular radio network or over a voice-oriented public telephone network (e.g., voice-oriented network 203).

One or more input/output devices 217 may represent any input or output devices of computing device 210 not otherwise separately described herein. One or more input/output devices 217 may generate, receive, and/or process input from any type of device capable of detecting input from a human or machine; one or more input/output devices 217 may generate, present, and/or process output through any type of device capable of producing output. Some devices may serve as input devices, some devices may serve as output devices, and some devices may serve as both input and output devices.

User interface device 221 may function as an input and/or output device or set of input/output devices for computing device 210, and may be implemented using various devices, components, and/or technologies. User interface device 221 may include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input; user interface device 221 may include display devices, speaker technologies, haptic feedback technologies, tactile feedback technologies, light emitting technologies, or other output device technologies for use in outputting information to a user.

In the example of FIG. 2, user interface device 221 includes one or more displays 223, one or more presence-sensitive panels 225, one or more audio input devices 227, and one or more audio output devices 229. Although certain components associated with computing device 210 are described or illustrated in FIG. 2 as being implemented within user interface device 221, in other examples, such components could be implemented external to user interface device 221, and other components could be implemented within user interface device 221. Further, while illustrated as an internal component of computing device 210, user interface device 221 may also represent an external or partially external component that shares a data path with computing device 210 for transmitting and/or receiving input and output. For instance, in some examples, user interface device 221 represents a built-in component of computing device 210 located within and physically connected to the external packaging of computing device 210 (e.g., a screen on a mobile phone). In other examples, user interface device 221 represents an external component of computing device 210 located outside and physically separated from the packaging or housing of computing device 210 (e.g., a monitor, a projector, etc. that shares a wired and/or wireless data path with computing device 210). In still other examples, one or more components of user interface device 221 may be built-in components of computing device 210, and one or more components of user interface device 221 may be external components of computing device 210 (e.g., some components of user interface device 221 may be internal, and others may be external). Further, one or more components of user interface device 221 may be integrated together, so that one component is or appears to be a built-in component of another.

For instance, display 223 may integrated with presence-sensitive panel 225, so that user interface device 221 includes or operates as a touch-sensitive or presence-sensitive display screen. In such an implementation, user interface device 221 may receive indications of tactile input by detecting one or more gestures from a user (e.g., the user touching or pointing to one or more locations of display 223 with a finger or a stylus pen). User interface device 221 may present output to a user as a graphical user interface at display 223. For example, user interface device 221 may present various user interfaces related to functions provided by one or more modules of computing device 210 or another feature of a computing platform, operating system, application, and/or service executing at or accessible from computing device 210 (e.g., an electronic message application, Internet browser application, a mobile or desktop operating system, etc.).

One or more displays 223 may generally refer to any appropriate type of display device, such as a display associated with any type of computing device, such as a tablet, mobile phone, watch, or any other type of wearable, non-wearable, mobile, or non-mobile computing device. Display 223 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display 223 may include a cathode ray tube (CRT) monitor, liquid crystal display (LCD), Light-Emitting Diode (LED) display, or any other type of display device.

Display 223 may output information to a user in the form of a user interface (e.g., as shown in FIG. 1A), which may be associated with functionality provided by computing device 210. Such user interfaces may be associated with computing platforms, operating systems, applications, and/or services executing at or accessible from computing device 210 (e.g., banking applications, electronic message applications, chat applications, Internet browser applications, mobile or desktop operating systems, social media applications, electronic games, and other types of applications). For example, display 223 may present one or more user interfaces which are graphical user interfaces of an application executing at computing device 210 including various graphical elements displayed at various locations of display 223.

One or more presence-sensitive panels 225 may serve as an input device, and may detect an object, such as a finger or stylus, and determine a location (e.g., an x and y coordinate) of the object relative to a panel. Presence-sensitive panel 225 may be implemented using a resistive touchscreen or panel, a surface acoustic wave touchscreen or panel, a capacitive touchscreen or panel, a projective capacitance touchscreen or panel, a pressure-sensitive panel, an acoustic pulse recognition touchscreen or panel, or any other presence-sensitive panel (PSP) technology now known or hereafter conceived. In some examples, presence-sensitive panel 225 may provide output to a user using tactile, haptic, audio, visual, or video stimuli. For example, presence-sensitive panel 225 may be integrated into a display component (e.g., display 223), so that presence-sensitive panel 225 serves as a touch-sensitive display screen. In such an example, presence-sensitive panel 225 may determine the location of that portion of the surface of display 223 selected by a stylus or a user's finger using capacitive, inductive, and/or optical recognition techniques. Based on such input, presence-sensitive panel 225 may output or update a graphical user interface presented at display 223.

One or more audio input devices 227 may include audio detection devices, microphones, and/or audio sensors that detect voices, sounds, or other audio information. In some examples, audio input device 227 may be configured to detect primarily voices. Audio input device 227 may include an audio or signal processing hardware or one or more audio or signal processing modules. For example, an audio processor may perform adjustments to sounds detected by audio input device 227 to improve sound quality or clarity, reduce or cancel background noise, isolate certain frequencies, isolate certain sounds (e.g., human speech), or for another purpose. An audio or signal processor associated with audio input device 227 may encrypt sounds, audio information, or indications of audio information by applying a public or private encryption key pursuant to an encryption algorithm. Audio input device 227 may output indications of audio input reflecting input detected by audio input device 227.

One or more audio output devices 229 may operate to convert an electrical signal into a corresponding sound. In some examples, audio output device 229 may comprise an electroacoustic transducer or a loudspeaker (or speaker), which may be housed in an enclosure configured to enhance the quality of the sound. In other examples, audio output device 229 may comprise a loudspeaker or speaker built into a housing of computing device 210, or may comprise a loudspeaker or speaker built into a set of wired or wireless headphones that may be or may be capable of being operably coupled to computing device 210. In some examples, audio output device 229 may generate audio sounds associated with images or a video displayed on a display device associated with computing device 210.

One or more storage devices 230 within computing device 210 may store information for processing during operation of computing device 210. Storage devices 230 may store program instructions and/or data associated with one or more of the modules described in accordance with one or more aspects of this disclosure. One or more processors 213 and one or more storage devices 230 may provide an operating environment or platform for such modules, which may be implemented as software, but may in some examples include any combination of hardware, firmware, and software. One or more processors 213 may execute instructions and one or more storage devices 230 may store instructions and/or data of one or more modules. The combination of processors 213 and storage devices 230 may retrieve, store, and/or execute the instructions and/or data of one or more applications, modules, or software. Processors 213 and/or storage devices 230 may also be operably coupled to one or more other software and/or hardware components, including, but not limited to, one or more of the components of computing device 210 and/or one or more devices or systems illustrated as being connected to computing device 210.

User interface module 231 may manage user interactions with user interface device 221 and other components of computing device 210. User interface module 231 may cause user interface device 221 to output various user interfaces for display or presentation or otherwise, as a user of computing device 210 views, hears, or otherwise senses output and/or provides input at user interface device 221. User interface device 221 may detect input, and may output to user interface module 231 one or more indications of input as a user of computing device 210 interacts with a user interface presented at user interface device 221. User interface module 231 and user interface device 221 may interpret inputs detected at user interface device 221 and may relay information about the inputs detected at user interface device 221 to one or more associated platforms, operating systems, applications, and/or services executing at computing device 210 to cause computing device 210 to perform one or more functions.

User interface module 231 may receive information and instructions from a platform, operating system, application, and/or service executing at computing device 210 and/or one or more remote computing systems. In addition, user interface module 231 may act as an intermediary between a platform, operating system, application, and/or service executing at computing device 210 and various output devices of computing device 210 (e.g., speakers, LED indicators, audio or electrostatic haptic output devices, light emitting technologies, displays, etc.) to produce output (e.g., a graphic, a flash of light, a sound, a haptic response, etc.).

Authentication module 232 may perform functions relating to authenticating computing device 210 with other systems, such as computing system 240. Authentication module 232 may receive information sufficient to generate a user interface, and authentication module 232 may cause user interface module 231 to present a visual user interface (e.g., user interface 114) at display 223 or, alternatively, output an audio voice-prompt user interface through audio output device 229. Authentication module 232 may determine that input detected by user interface device 221 corresponds to authentication credentials (e.g., a username and password or audio of a spoken passphrase), and authentication module 232 may cause communication unit 215 to communicate information about such authentication credentials over network 201. Authentication module 232 may also interact with IVR system 170, by, for example, causing computing device 210 to place a phone call to IVR system 170 over network 201 or network 203. During such a call, authentication module 232 may output DTMF codes corresponding to a device identifier and/or a passcode to IVR system 170 in an attempt to identify computing device 210 or authenticate a user of computing device 210.

One or more application modules 239 may represent some or all of the other various individual applications and/or services executing at and accessible from computing device 210. A user of computing device 210 may interact with a user interface (e.g., visual, graphical, or voice-prompt user interface) associated with one or more application modules 239 to cause computing device 210 to perform a function. Numerous examples of application modules 239 may exist and may include banking applications, financial record-keeping applications, financial services applications, web browsing, search, communication, and shopping applications, and any and all other applications that may execute at computing device 210.

Modules illustrated in FIG. 2 (e.g., user interface module 231, authentication module 232, application modules 239, authentication module 252, enrollment module 254, banking module 258) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

In the example of FIG. 2, and in accordance with one or more aspects of the present disclosure, computing system 240 may authenticate a user of computing device 210. For instance, in an example that can be described in connection with FIG. 2, presence-sensitive panel 225 of computing device 210 detects input. Presence-sensitive panel 225 outputs to user interface module 231 an indication of input. User interface module 231 determines that the input includes a number of taps, gestures, or touch-screen interactions that correspond to a request to interact with computing system 240. User interface module 231 causes display 223 to present a user interface (e.g., user interface 112 of FIG. 1A), prompting a user of computing device 110 to present authentication credentials. Presence-sensitive panel 225 detects further input and outputs to user interface module 231 an indication of input. User interface module 231 outputs to authentication module 232 information about the input. Authentication module 232 determines that the input corresponds to a username and password. Authentication module 232 causes communication unit 215 to output a signal over network 201. Communication unit 245 of computing system 240 detects a signal, and outputs to authentication module 252 an indication of the signal. Authentication module 252 determines that the signal includes authentication credentials for a user of computing device 210. Authentication module 252 further identifies the user, and determines that the user of computing device 210 has entered a valid username and password combination. Authentication module 252 may cause communication unit 245 to further communicate with computing device 210 over network 201 and establish a session with computing device 210 operated by the user.

Computing system 240 may provide to computing device 210 instructions for establishing a voice authentication credential for a user of computing device 210. For instance, in the example being described, and with reference to FIG. 2, enrollment module 254 determines that the authenticated user of computing device 210 is a candidate for establishing a voice authentication credential, and/or is being offered the opportunity to establish a voice authentication credential. Enrollment module 254 causes communication unit 245 to output a signal over network 201. Communication unit 215 of computing device 210 detects a signal over network 201 and outputs an indication of the signal to authentication module 232. Authentication module 232 determines that the signal corresponds to information sufficient to generate a user interface. Authentication module 232 causes user interface module 231 to present a user interface (e.g., user interface 114 of FIG. 1A) at display 223. Presence-sensitive panel 225 detects input that authentication module 232 determines corresponds to a user selecting button 115. Authentication module 232 causes communication unit 215 to output a signal over network 201.

Communication unit 245 of computing system 240 detects a signal and outputs to enrollment module 254 an indication of the signal. Enrollment module 254 determines that the signal corresponds to a request to establish a voice authentication credential. In response, enrollment module 254 generates and stores session data 256 associated with computing device 210. Session data 256 may include a device identifier associated with or identifying computing device 210, a passcode associated with the session with computing device 210, and a phone number that computing device 210 may use to contact IVR system 170. Enrollment module 254 causes communication unit 245 to output a signal over network 201. Communication unit 215 of computing device 210 detects a signal over network 201, and outputs to authentication module 232 an indication of the signal. Authentication module 232 determines that the signal includes instructions, including a phone number and a one-time passcode.

Computing device 210 may use the instructions to interact with IVR system 170 as an authenticated user. For instance, in the example being described, and with reference to FIG. 2, authentication module 232 causes communication unit 215 to initiate a phone call to IVR system 170 over voice-oriented network 203. In some examples, computing device 210 initiates the phone call to IVR system 170 over voice-oriented network 203 (used for voice calls), rather than over network 201 (used for data communications). In other examples, however, computing device 210 may initiate the phone call to IVR system 170 over a different network, such as network 201. In the described example, IVR system 170 receives an indication of the call from computing device 210, and thereafter communicates with computing device 210 over voice-oriented network 203. Communication unit 215 of computing device 210 sends, over voice-oriented network 203, to IVR system 170, the device identifier and the one-time passcode received from computing system 240. IVR system 170 receives the information from computing device 210, and in response, outputs a signal over network 201. Communication unit 245 of computing system 240 detects a signal and outputs to enrollment module 254 an indication of the signal. Enrollment module 254 determines that the signal includes a device identifier and a one-time passcode. Enrollment module 254 compares the device identifier and the one-time passcode to the previously-stored session data 256 associated with computing device 210. Enrollment module 254 determines that the device identifier and the one-time passcode matches and/or is consistent with session data 256. Enrollment module 254 causes communication unit 245 to output a signal over network 201. IVR system 170 detects a signal and determines that the signal is indicates that computing system 240 has determined that the user operating computing device 210 is an authenticated user.

Voice biometric services system 180 may create voiceprint 182 for the authenticated user of computing device 210. For instance, in the example being described, and still referring to FIG. 2, IVR system 170 outputs a signal over network 201. Communication unit 215 of computing device 210 detects a signal and outputs an indication of the signal to authentication module 232. Authentication module 232 determines that the signal includes information sufficient to generate a voice prompt. Authentication module 232 causes audio output device 229 to output audio, which in some examples, may be a user prompt such as "To establish a voice authentication credential, please say 'my voice is my password.' Audio input device 227 detects input and outputs to user interface module 231 an indication of input. User interface module 231 outputs to authentication module 232 information about the input. Authentication module 232 determines that the input corresponds to audio input in response to the user prompt output by audio output device 229. Authentication module 232 causes communication unit 215 to output a signal over network 201. IVR system 170 detects a signal and determines that the signal includes audio input from a user of computing device 110. IVR system 170 communicates to voice biometric services system 180 information about the audio input. IVR system 170 may further communicate with computing device 210 and receive from computing device 210 further audio input. IVR system 170 may communicate to voice biometric services system 180 information about any additional audio input. Voice biometric services system 180 may determine that the audio input is sufficient to create voiceprint 182 associated with computing device 210. Voice biometric services system 180 stores voiceprint 182 within voiceprint data store 181. In some examples, a device identifier for computing device 210 is associated with or stored with voiceprint 182.

Once voiceprint 182 has been established, computing device 210 may thereafter communicate a spoken passphrase to voice biometric services system 180 for authentication, thereby enabling access to other systems, such as banking system 190 (see, e.g., FIG. 1B). For instance, in the example being described, and still referring to FIG. 2, presence-sensitive panel 225 of computing device 210 detects input that authentication module 232 determines corresponds to a request to interact with computing system 240. Authentication module 232 causes user interface module 231 to present a user interface, through user interface device 221, prompting the user of computing device 110 to input authentication credentials. In some examples, user interface module 231 causes display 223 to present a visual user interface (e.g., user interface 119 of FIG. 1B) prompting the user of computing device 210 to speak a passphrase. In other examples, user interface module 231 causes audio output device 229 of user interface device 221 to output an audio sound (e.g., "please say 'my voice is my password'"), prompting the user to speak the specified passphrase. Audio input device 227 of user interface device 221 detects input and outputs to user interface module 231 an indication of input. User interface module 231 outputs to authentication module 232 information about the input. Authentication module 232 determines that the input corresponds to a response to the prompt to speak a passphrase. Authentication module 232 causes communication unit 215 to output a signal over network 201. Communication unit 245 of computing system 240 detects input and outputs to authentication module 252 an indication of input. Authentication module 252 determines that the input corresponds to an audio passphrase from a user of computing device 210. Authentication module 252 causes communication unit 245 to output a signal over network 201. Voice biometric services system 180 detects the signal and determines that it corresponds to a spoken passphrase uttered by a user of computing device 210. In some examples, voice biometric services system 180 may determine that the signal further includes a device identifier associated with computing device 210.

Voice biometric services system 180 may authenticate the user of computing device 210 based on the passphrase. For instance, continuing with the same example, voice biometric services system 180 compares the information received from computing system 240 to voiceprint 182, and determines that the information from computing system 240 is sufficient to authenticate the user of computing device 210. For example, voice biometric services system 180 may compare a spoken passphrase and from computing system 240 to voiceprint 182. Voice biometric services system 180 may also compare a device identifier from computing system 240 to a device identifier associated with and/or stored with voiceprint 182 in voiceprint data store 181. Voice biometric services system 180 may determine that the voiceprint and device identifier sufficiently matches voiceprint 182 and any previously-stored device identifier.

In response, voice biometric services system 180 outputs a signal over network 201. Communication unit 245 of computing system 240 detects a signal and outputs an indication of the signal to authentication module 252. Authentication module 252 determines that the signal indicates that voice biometric services system 180 has authenticated the user of computing device 210. Authentication module 252 causes communication unit 245 to output a signal over network 201. Communication unit 215 of computing device 210 detects a signal and outputs to authentication module 232 an indication of a signal. Authentication module 232 determines that the signal corresponds to confirmation that the user of computing device 210 has been authenticated. Computing device 210 and computing system 240 may further communicate and establish an authenticated session. Computing system 240 may, in response to input received over network 201 from computing device 210, perform services on behalf of the authenticated user of computing device 210 during the authenticated session. In some examples, services performed by computing system 240 may invoke banking services, which may be performed by banking module 258 of computing system 240.

In some examples, voice biometric services system 180 may analyze audio data received from computing device 210 in an attempt to ensure that audio data received from computing device 210 is a live utterance, rather than a recording of a previous utterance. For instance, one way in which an unauthorized user may attempt to defeat a voice authentication system is to record a passphrase utterance made by an authorized user, and then later replay that recorded utterance in response to a prompt to say a passphrase. Accordingly, voice biometric services system 180 may, in some examples, attempt to determine whether audio data received from computing device 210 exhibits characteristics consistent with a recording or a reproduction of a previously-uttered passphrase. In some examples, certain pops or other artifacts of recorded audio may be present in audio data generated from a recording, and can be used to make such a determination.

If voice biometric services system 180 suspects that audio received from computing device 210 is a recorded passphrase, voice biometric services system 180 may output, over network 201, a request for additional information. Authentication module 252 of computing system 240 may receive an indication of the request, and output a signal over network 201. Communication unit 215 of computing device 210 may detect the signal and output to authentication module 232 an indication of the signal. Authentication module 232 may determine that the signal corresponds to information sufficient to generate a user interface. Authentication module 232 may cause user interface device 221 to output an audio and/or visual user interface, prompting a user of computing device 210 to utter a secondary passphrase. The secondary passphrase may be one of a defined set of alternative passphrases. User interface device 221 may detect input that authentication module 232 determines corresponds to a response to the prompt. In response, authentication module 232 may cause communication unit 215 to output a signal over network 201. Authentication module 252 of computing system 240 may receive an indication of the signal, and output to voice biometric services system 180 information about the signal. Voice biometric services system 180 may determine that the signal corresponds to audio data for a spoken alternative passphrase. Voice biometric services system 180 may evaluate the audio data and either authenticate the user of computing device 210, deny access, request additional information, or perform another action.

In some examples described herein in connection with FIG. 2, voice biometric services system 180 is described as communicating with computing device 210 through computing system 240. In other examples, voice biometric services system 180 may, in some situations, communicate with computing device 210 directly, or through other devices.

Figure 3:
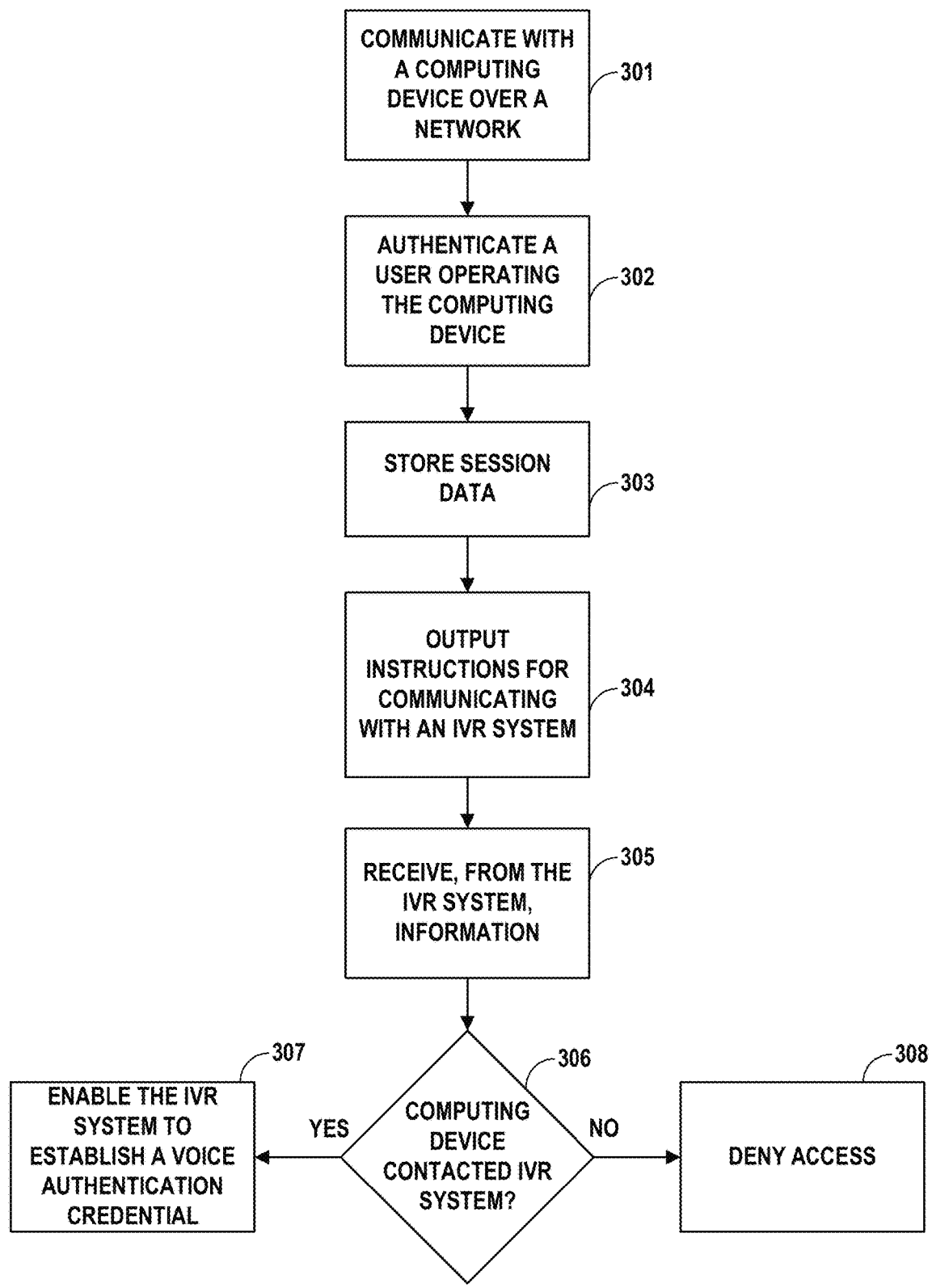
FIG. 3 is a flow diagram illustrating operations performed by an example computing system in accordance with one or more aspects of the present disclosure.

FIG. 3 is a flow diagram illustrating operations performed by an example computing system in accordance with one or more aspects of the present disclosure. FIG. 3 is described below within the context of computing system 240 of FIG. 2. In other examples, operations described in FIG. 3 may be performed by one or more other components, modules, systems, or devices. Further, in other examples, operations described in connection with FIG. 3 may be merged, performed in a difference sequence, or omitted.

In the example of FIG. 3, and in accordance with one or more aspects of the present disclosure, computing system 240 may communicate with a computing device over a network (301). For instance, in some examples, communication unit 245 of computing system 240 detects a signal, and determines that the signal corresponds to a communication from computing device 210 over network 201.

Computing system 240 may authenticate, based on the communications with the computing device, a user operating the computing device (302). For instance, in some examples, authentication module 252 determines that the signal includes authentication credentials for a user of computing device 210. Authentication module 252 determines, based on the authentication credentials, that the user of computing device 210 is a known user who has entered a valid username and password combination. Authentication module 252 may cause communication unit 245 to further communicate with computing device 210 over network 201 and establish a session with the authenticated user of computing device 210.

Computing system 240 may store session data associated with the computing device (303). For instance, in some examples, communication unit 245 of computing system 240 detects a signal and outputs to enrollment module 254 an indication of the signal. Enrollment module 254 determines that the signal corresponds to a request to establish a voice authentication credential from computing device 210. In response, enrollment module 254 generates and stores session data 256 associated with computing device 210.

Computing system 240 may output, to the computing device, instructions for communicating with an interactive voice response (IVR) system (304). For instance, in some examples, enrollment module 254 causes communication unit 245 to output a signal over network 201. Communication unit 215 of computing device 210 detects a signal over network 201, and outputs to authentication module 232 an indication of the signal. Authentication module 232 determines that the signal includes a phone number and a one-time passcode.

Computing system 240 may receive, from the IVR system, information (305). For instance, in some examples, communication unit 245 of computing system 240 detects a signal and outputs to enrollment module 254 an indication of the signal. Enrollment module 254 determines that the signal includes a device identifier and a one-time passcode from IVR system 170.

Computing system 240 may determine, based on the information and the stored session data, that the computing device has contacted the IVR system using the instructions (306). For instance, in some examples, enrollment module 254 compares the device identifier and the one-time passcode received from IVR system 170 to information included in the previously-stored session data 256 associated with computing device 210.

If computing system 240 determines that the computing device has contacted the IVR system (YES branch of 306), computing system 240 may enable the IVR system 170 to establish a voice authentication credential for the user of the computing device (307). For instance, in some examples, enrollment module 254 determines that the device identifier and the one-time passcode matches and/or is consistent with session data 256. Enrollment module 254 causes communication unit 245 to output a signal over network 201. IVR system 170 detects a signal and determines that the signal indicates that computing system 240 has determined that the user operating computing device 210 is an authenticated user operating the same computing device 110 for which session data 256 was previously stored. If computing system 240 determines that the appropriate computing device has not been shown to contact the IVR system (NO branch of 306), computing system 240 may deny access to functionality of IVR system 170 that creates voice authentication credentials (308).

Aspects of the present disclosure relating to IVR systems and related systems are further described in the following references, each of which is hereby fully incorporated by reference: U.S. patent application Ser. No. 15/385,484, filed Dec. 20, 2016, U.S. patent application Ser. No. 15/385,526, filed Dec. 20, 2016, and U.S. Provisional Patent Application No. 62/399,287 filed on Sep. 23, 2016.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    outputting, by a mobile device and over a network to a computing system, information that includes authentication information and a request to establish a voice authentication credential for a user operating the mobile device;
    enabling the computing system to determine, based on the authentication information, that the mobile device is operated by an authorized user;
    receiving, by the mobile device over the network, instructions for communicating with an interactive voice response (IVR) system;
    establishing, by the mobile device and based on the instructions, communications with the IVR system over the network;
    enabling the IVR system to verify, based on the communications, that the mobile device previously output the request to establish a voice authentication credential;
    detecting, by the mobile device, audio data;
    outputting, by the mobile device and over the network to the IVR system, information about the audio data;
    enabling the IVR system to create a voiceprint based on the audio data and communicate the voiceprint to the computing system for use as an authentication credential;
    detecting, by the mobile device and after enabling the IVR system to communicate the voiceprint to the computing system for use as an authentication credential, audio authentication information;
    outputting, by the mobile device and over the network to the computing system, information about the audio authentication information; and
    enabling the computing system to authenticate the mobile device without interacting with the IVR system and based on the audio authentication information.

2. The method of claim 1, wherein receiving instructions for communicating with the IVR system includes:
    receiving a phone number at which the IVR can be contacted.

3. The method of claim 2, wherein receiving instructions for communicating with the IVR system further includes:
    receiving a passcode generated by the computing system in response to the request to establish the voice authentication credential.

4. The method of claim 3, wherein the passcode has an expiration timeframe, and wherein establishing communications with the IVR system further includes:
    enabling the IVR system to verify that the passcode has not expired.

5. The method of claim 3, wherein establishing communications with the IVR system includes:
    establishing communications with the IVR system by placing a call to the IVR system at the phone number, wherein placing the call to the IVR system is performed by the mobile device without requiring further input from the user.

6. The method of claim 5, wherein establishing communications with the IVR system further includes:
    outputting the passcode over the network to the IVR system during the call using dual tone multi frequency tones.

7. The method of claim 5, wherein the authentication information includes a device identifier associated with the mobile device, and wherein establishing communications with the IVR system further includes:
    outputting the device identifier and the passcode over the network to the IVR system during the call using dual tone multi frequency tones.

8. The method of claim 1, wherein enabling the IVR system to verify that the mobile device previously output the request to establish a voice authentication credential includes:
    enabling the IVR system to communicate with the computing system.

9. The method of claim 1, wherein detecting audio data includes:
    outputting, by the mobile device, a user interface prompting the user to utter a phrase.

10. A mobile device comprising a storage system and processing circuitry, wherein the processing circuitry has access to the storage system and is configured to:
    output, over a network to a computing system, information that includes authentication information and a request to establish a voice authentication credential for a user operating the mobile device;
    enable the computing system to determine, based on the authentication information, that the mobile device is operated by an authorized user;

receive, over the network, instructions for communicating with an interactive voice response (IVR) system, wherein the instructions include a phone number at which the IVR can be contacted and a passcode generated by the computing system in response to the request to establish the voice authentication credential;

establish, based on the instructions, communications with the IVR system over the network;

enable the IVR system to verify, based on the communications, that the mobile device that established communications with the IVR system previously output the request to establish a voice authentication credential;

detect audio data;

output, over the network to the IVR system, information about the audio data; and enable the IVR system to create a voiceprint based on the audio data and communicate the voiceprint to the computing system for use as an authentication credential.

11. The mobile device of claim 10, wherein the processing circuitry is further configured to:

detect, after enabling the IVR system to communicate the voiceprint to the computing system for use as an authentication credential, audio authentication information;

output, over the network to the computing system, information about the audio authentication information; and enable the computing system to authenticate the mobile device without interacting with the IVR system and based on the audio authentication information.

12. The mobile device of claim 10, wherein the passcode has an expiration timeframe, and wherein to establish communications with the IVR system, the processing circuitry is further configured to:

enable the IVR system to verify that the passcode has not expired.

13. The mobile device of claim 10, wherein to establish communications with the IVR system, the processing circuitry is further configured to:

establish communications with the IVR system by placing a call to the IVR system at the phone number, wherein placing the call to the IVR system is performed by the mobile device without requiring further input from the user.

14. The mobile device of claim 13, wherein to establish communications with the IVR system, the processing circuitry is further configured to:

output the passcode over the network to the IVR system during the call using dual tone multi frequency tones.

15. The mobile device of claim 13, wherein the authentication information includes a device identifier associated with the mobile device, and wherein to establish communications with the IVR system, the processing circuitry is further configured to:

output the device identifier and the passcode over the network to the IVR system during the call using dual tone multi frequency tones.

16. The mobile device of claim 10, wherein to enable the IVR system to verify that the mobile device previously output the request to establish a voice authentication credential, the processing circuitry is further configured to:

enable the IVR system to communicate with the computing system.

17. A non-transitory computer-readable storage medium comprising instructions that, when executed, configure processing circuitry of a mobile device to:

output, over a network to a computing system, information that includes authentication information and a request to establish a voice authentication credential for a user operating the mobile device;

enable the computing system to determine, based on the authentication information, that the mobile device is operated by an authorized user;

receive, over the network, instructions for communicating with an interactive voice response (IVR) system, wherein the instructions include a phone number at which the IVR can be contacted and a passcode generated by the computing system in response to the request to establish the voice authentication credential;

establish, based on the instructions, communications with the IVR system over the network;

enable the IVR system to verify, based on the communications, that the mobile device that established communications with the IVR system previously output the request to establish a voice authentication credential;

detect audio data;

output, over the network to the IVR system, information about the audio data; and enable the IVR system to create a voiceprint based on the audio data and communicate the voiceprint to the computing system for use as an authentication credential.

* * * * *